United States Patent
Gao et al.

(10) Patent No.: US 11,490,127 B2
(45) Date of Patent: Nov. 1, 2022

(54) METHOD AND APPARATUS FOR PROVIDING CLOUD-BASED VIDEO ENCODING

(71) Applicant: ATI Technologies ULC, Markahm (CA)

(72) Inventors: Wei Gao, Toronto (CA); Ihab Amer, Markham (CA); Feng Pan, Markham (CA); Mingkai Shao, Markham (CA); Crystal Sau, Markham (CA); Dong Liu, Markham (CA); Gabor Sines, Toronto (CA); Yang Liu, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/139,372

(22) Filed: Dec. 31, 2020

(65) Prior Publication Data

US 2022/0210479 A1 Jun. 30, 2022

(51) Int. Cl.
*H04N 19/90* (2014.01)
*H04N 19/154* (2014.01)

(52) U.S. Cl.
CPC ........... *H04N 19/90* (2014.11); *H04N 19/154* (2014.11)

(58) Field of Classification Search
CPC ............................. H04N 19/90; H04N 19/154
See application file for complete search history.

(56) References Cited

U.S. PATENT DOCUMENTS

| | | | |
|---|---|---|---|
| 2013/0094564 A1* | 4/2013 | Yang ...................... | H04N 19/10 375/240.02 |
| 2017/0078686 A1* | 3/2017 | Coward ................. | H04N 19/90 |
| 2019/0042316 A1* | 2/2019 | Luo ....................... | H04N 19/436 |
| 2020/0186751 A1* | 6/2020 | Tran ................... | H04N 5/23206 |
| 2020/0221141 A1* | 7/2020 | Katsavounidis ..... | H04N 19/147 |

* cited by examiner

*Primary Examiner* — Tracy Y. Li (57) ABSTRACT

Methods and apparatus provide cloud-based video encoding that generates encoded video data by one or more encoders in a cloud platform for a plurality of cloud encoding sessions. The methods and apparatus generate operational improvement tradeoff data in response to operational encoding metrics associated with the one or more encoders and change operational characteristics of the one or more encoders for at least one of the cloud encoding sessions based on the operational improvement tradeoff data.

20 Claims, 7 Drawing Sheets

METHOD AND APPARATUS FOR PROVIDING CLOUD-BASED VIDEO ENCODING

BACKGROUND OF THE DISCLOSURE

Cloud-based video encoders are provided by service providers in cloud-based gaming platforms, cloud-based video conferencing platforms and other cloud-based platforms that provide video encoding. For example, cloud-based gaming platforms may include one or more cloud servers that include a host processor, and one or more graphics processors (GPUs) that render graphics content for one or more gaming applications remotely for one or more client devices that include a decoder. The servers include one or more video encoders. In some examples, the encoders are integrated with graphics processing chips, in other systems the encoders are separate chips. A single encoder can produce multiple encoding sessions. In other examples, each encoder outputs a single encoding session. Typically, an encoder controller within the server provides the initial operational settings for the encoders.

A gaming application and cloud gaming platform may provide multiple encoding sessions for the same application to different users of the application or provide multiple encoding sessions for different gaming applications running on the platform. For example, one user may have an encoding session that serves encoded data for a camera-based picture-in-picture window on the client device as well as another encoding session that presents the foreground game being played.

For cloud-based video encoder platforms, it can be difficult for a service provider to decide how to partition server resources among all encoding tasks without the feedback information from end users when multiple video applications are running on the server. For example, typical encoder optimization techniques are dedicated to a single application in an effort to achieve the best image quality and other performance characteristics given fixed resources such as processing power and network bandwidth. However, it is not necessarily optimal to give fixed or equal resource allocations for all encoder applications.

Some cloud-based platforms attempt to adaptively multiplex multiple encoded video streams based on the amount of network bandwidth consumed by each stream. For example, if network bandwidth is the criteria used, a stream consuming more bandwidth may be multiplexed with a stream requiring less bandwidth so that the total output network bandwidth of the platform would not be exceeded. In such methods, an encoder acts passively and provides bandwidth information back to the encoder controller when requested. However, the encoder controller within the platform needs some time to learn the encoder behavior based on the limited feedback information. Such cloud-based encoding systems can fail to provide adequate image quality for users of the client devices and can result in inefficient power usage and inefficient bandwidth allocation among encoders.

In some scenarios, the same graphics processing unit (GPU) processes multiple encoding sessions where one session is for a user of one remote device while another session is for a different user with another remote device for the same gaming application where two players are playing the same game being provided by the gaming platform. In some examples, the video resolution of the stream is for a 4K resolution at 30 frames per second (fps) and as such image quality is an important feature to maintain. In some systems, the server is unaware of network bandwidth restrictions unless a client device provides information indicating that poor quality images are being produced at the client device. In other systems, a server detects network congestion by sending test packets through the network. However, when the server gets poor quality information from an end user device, such information can arrive too late so that the server cannot adjust quickly enough to provide a suitable image output for a user resulting in unnecessary image quality failures and unnecessary network congestion.

In some implementations, when the server receives information from an end user client device indicating a bad quality condition, the server performs a type of return on investment analysis to determine how to improve encoding output by adjusting, for example, power consumed by an encoder through increasing a clock frequency for the encoder, or through allocating more bandwidth to an encoder or other options for changing the encoder performance characteristics. However, such analysis is not typically performed until the server receives information from a client device indicating that a bad quality is occurring, and the adjustment can result in delayed corrections. Alternatively, a service provider can do content pre-analysis and allocate bandwidth accordingly. But content is changing dynamically. For real time video application, like live streaming, the service provider might not know exactly the type or the complexity of content under encoding. In such cases, the service provider still needs to rely on the feedback about video quality from end users. According it is desirable to provide improved cloud encoding techniques.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Methods and apparatus in some implementations employ encoders that communicate to a server encoder controller hints about return on investment scenarios that apply for different operational configurations of encoders so that the server makes a decision to optimally allocate encoder resources in different encode sessions to achieve a more optimized encoding solution globally for the server.

In some implementations, a method for providing cloud-based video encoding includes generating encoded video data by one or more encoders in a cloud platform for a plurality of cloud encoding sessions, generating operational improvement tradeoff data in response to operational encoding metrics associated with the one or more encoders, and changing operational characteristics of the one or more encoders for at least one of the cloud encoding sessions based on the operational improvement tradeoff data.

In certain examples, the method includes providing the operational encoding metrics in response to encoding for each of the plurality of cloud encoding sessions and wherein changing operational characteristics include providing control data for the one or more encoders based on the operational improvement tradeoff data.

In some examples, the method includes comparing operational encoding metrics from the plurality of encoding sessions relative to each other and to available operational setting options for each encoding session and wherein the control data indicates one more operational characteristics to change for one of the encoding sessions.

In certain examples, providing control data causes at least one of an increase in image quality for video of one of the cloud encoding sessions, an increase in encoding speed for one of the cloud encoding sessions, an improvement in power savings associated with producing encoded data for one of the cloud encoding sessions, and an increase in bandwidth savings for one of the cloud encoding sessions.

In some examples, the method includes generating data for a cloud encoding session that represents at least one of: an image quality increase will occur for the cloud encoding session based on an increase in bandwidth allocation for the encoder, an image quality increase will occur for the cloud encoding session based on an increase in power for the encoder, an image quality increase will occur for the cloud encoding session based on an increase in encode time allowed for the encoder, an encoding speed increase will occur for the cloud encoding session based on an increase in power for the encoder, a power savings will occur for the encoder based on an increase in encode time allowed for the encoder, a bandwidth saving will occur for the cloud encoding session based on more power for the encoder, and a bandwidth saving will occur for the cloud encoding session based on more encoding time allowed for the encoder.

In certain examples, the plurality of encoding sessions are encoded on a same encoder and generating operational improvement tradeoff data is based on a difference in content type being encoded in the plurality of cloud encoding sessions. In some examples, the plurality of cloud encoding sessions are encoded on different encoders and operational improvement tradeoff data is based on a quality level being generated by each encoder for each cloud encoding session.

In certain examples, changing operational characteristics includes providing control data to the one or more encoders that changes an image quality level of one of the cloud encoding sessions based on the operational improvement tradeoff data.

In some implementations, an apparatus for providing cloud-based video encoding includes a cloud-based video encoder controller and one or more video encoders that generate encoded video data for a plurality of cloud encoding sessions. The encoders generate operational improvement tradeoff data in response to operational encoding metrics associated with the one or more encoders, and the video encoder controller changes operational characteristics of the one or more encoders for at least one of the cloud encoding sessions based on the operational encoding tradeoff data.

In certain examples, the one or more encoders provide operational encoding metrics for each of the plurality of cloud encoding sessions to the encoder controller. In some implementations, the encoder controller generates the operational improvement tradeoff data based on the operational encoding metrics for each of the plurality of encoding sessions and encoder controller changes operational characteristics of the one or more encoders by providing control data to the one or more encoders based on the operational improvement tradeoff data.

In some examples, one of more of the encoders or the encoder controller generates operational improvement tradeoff data by comparing operational encoding metrics from the plurality of encoding sessions relative to each other and to available operational setting options for the encoder. In some implementations, the control data indicates one more operational characteristics to change for one of the encoding sessions.

In certain examples, the encoder provides control data that causes at least one of: an increase in image quality for video of one of the cloud encoding sessions, an increase in encoding speed for one of the cloud encoding sessions, an improvement in power savings associated with producing encoded data for one of the cloud encoding sessions, and an increase in bandwidth savings for one of the cloud encoding sessions.

In some examples, the encoder generates operational improvement tradeoff data by generating data for a cloud encoding session that represents at least one of: an image quality increase will occur for the cloud encoding session based on an increase in bandwidth allocation for the encoder, an image quality increase will occur for the cloud encoding session based on an increase in power for the encoder, an image quality increase will occur for the cloud encoding session based on an increase in encode time allowed for the encoder, an encoding speed increase will occur for the cloud encoding session based on an increase in power for the encoder, a power savings will occur for the encoder based on an increase in encode time allowed for the encoder, a bandwidth saving will occur for the cloud encoding session based on more power for the encoder, and a bandwidth saving will occur for the cloud encoding session based on more encoding time allowed for the encoder.

In certain examples, the plurality of encoding sessions are encoded on a same encoder and operational improvement tradeoff data is based on a difference in content type being encoded in the plurality of cloud encoding sessions. In some examples, the plurality of cloud encoding sessions are encoded on different encoders and operational improvement tradeoff data is based on a quality level being generated by each encoder for each cloud encoding session.

In certain examples, changing operational characteristics includes providing control data to the one or more encoders that changes an image quality level of one of the cloud encoding sessions based on the operational improvement tradeoff data.

In some implementations, a cloud server for providing cloud-based video encoding includes a processor configured to execute an application that causes generation of cloud-based graphics content as video data for a remote device and one or more graphics processors that generate the cloud-based graphics content for a plurality of cloud encoding sessions. The cloud server includes a cloud-based video encoder controller and one or more video encoders that generate encoded video data for a plurality of cloud encoding sessions. In some implementations, the encoders generate operational improvement tradeoff data in response to operational encoding metrics associated with the one or more encoders. In certain implementations, the encoder controller generates the operational improvement tradeoff data. In some implementations, the cloud-based video encoder controller changes operational characteristics of the one or more encoders for at least one of the cloud encoding sessions based on the operational encoding tradeoff data.

In certain examples, the one or more encoders are configured to provide operational encoding metrics for each of the plurality of cloud encoding sessions to the encoder controller. Is some implementations, the encoder controller generates the operational improvement tradeoff data based on the operational encoding metrics for each of the plurality of encoding sessions, and changes operational characteristics of one or more encoders by providing control data to the one or more encoders based on the operational improvement tradeoff data.

In some examples, the encoder or encoder controller generates operational improvement tradeoff data by comparing operational encoding metrics from the plurality of encoding sessions relative to each other and to available operational setting options for the encoder. In certain example, the control data indicates one more operational characteristics of an encoder to change for one of the encoding sessions.

In certain examples, the encoder or encoder controller generates operational improvement tradeoff data by generating data for a cloud encoding session that represents at least one of: an image quality increase will occur for the cloud encoding session based on an increase in bandwidth allocation for the encoder, an image quality increase will occur for the cloud encoding session based on an increase in power for the encoder, an image quality increase will occur for the cloud encoding session based on an increase in encode time allowed for the encoder, an encode speed with occur for the cloud encoding session based on an increase in power for the encoder, a power savings will occur for the encoder based on an increase in encode time allowed for the encoder, a bandwidth saving will occur for the cloud encoding session based on more power for the encoder, and a bandwidth saving will occur for the cloud encoding session based on more encoding time allowed for the encoder.

Figure 1:
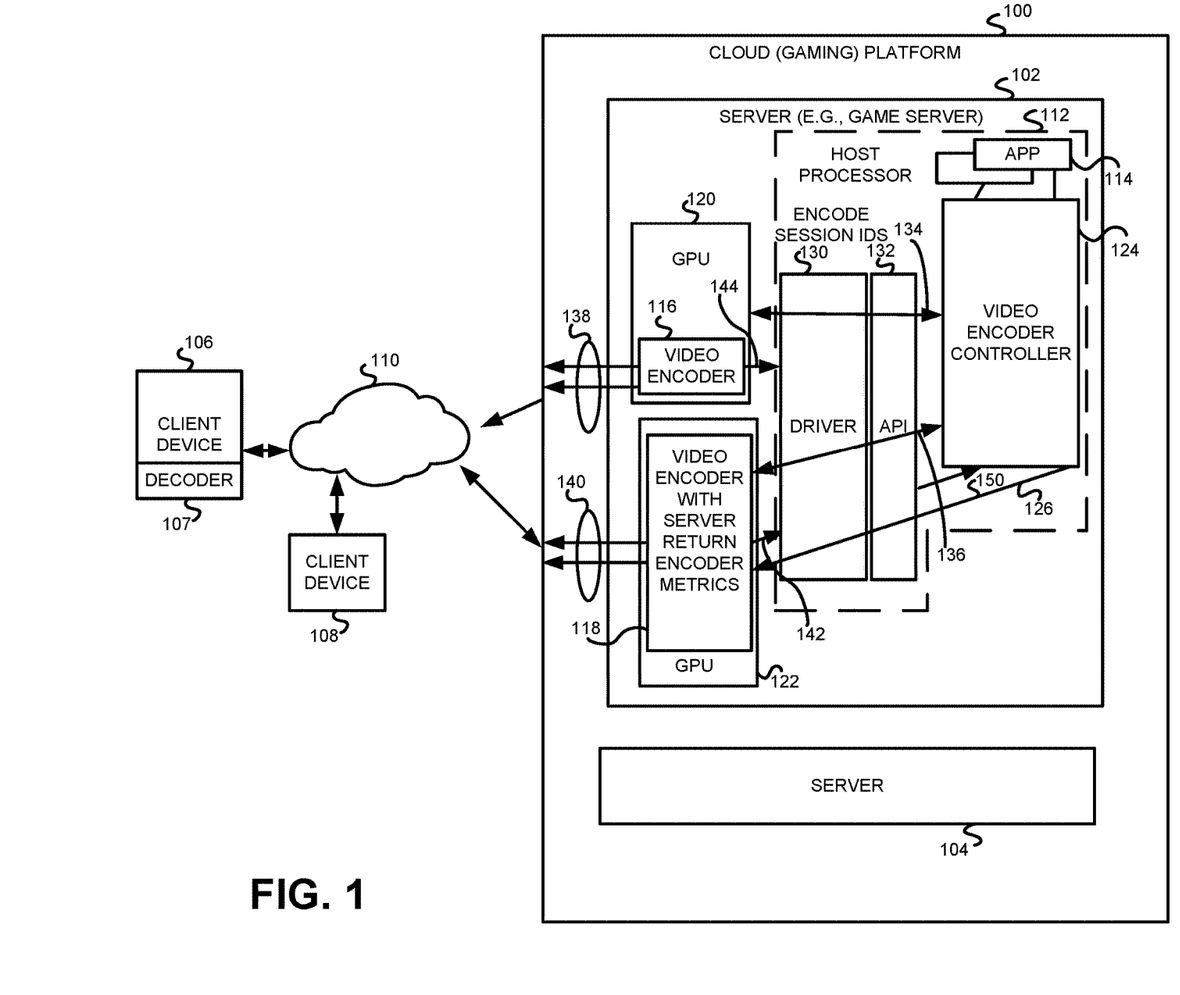
FIG. 1 is a block diagram illustrating a cloud server for providing cloud-based video encoding in accordance with one example set forth in the disclosure.

FIG. 1 illustrates one example of a cloud platform 100 that includes one or more cloud servers 102, 104 that provide cloud-based video encoding. The cloud platform 100 runs in one example, an interactive gaming application remotely in the cloud and streams the scenes as video sequences back to client devices 106, 108 that are used by users. The video sequences are sent as encoded video data via the internet 110 in this example. It will be recognized that the cloud platform 100 may be any suitable cloud platform and provide any suitable service other than a gaming service, such as other video encoding services including, but not limited to, real time video meeting services other suitable services as desired. The client devices 106 and 108 include a decoder 107 to decode received encoded video streams from the cloud platform 100. In other implementations the decoders are located in the cloud.

The cloud server 102 includes a processor 112 configured to execute one or more applications 114, in this example, gaming applications, that cause generation of cloud-based graphics content as video data for a remote device. As recognized by those of ordinary skill in the art, the processor 112 includes in some example one or more central processing unit (CPU) cores, APUs, or any other suitable processor structure. The cloud server 102 includes various forms of memory including random access memory, non-volatile memory or any other suitable memory. As shown in FIG. 1, the blocks in the processor are shown to be the processor executing stored code that when executed, causes the processor to carry out the operations as described herein.

The cloud server 102 in this example, includes a plurality of cloud-based video encoders 116 and 118 that are implemented as portions of a graphics processor 120 and 122, however any suitable video encoder structure may be employed. In this example, the graphics processors generate the cloud-based graphics content based on the running application 114, for a plurality of cloud encoding sessions. The cloud server 102 includes any suitable cloud services to allow multiple applications to be executed and to provide multiple encoding sessions for each application as desired. In this example, a video encoder controller 124, which in one example is code executing on a CPU, provides control data 126 to control operational characteristics of cloud-based video encoders 116 and 118. The video encoder controller 124 serves as a type of encoder workload allocator to allocate encoder sessions and control operational performance the various cloud-based video encoders 116 and 118. The video encoder controller 124 maintains a budget (e.g., set by the service provider) for each session such as a bandwidth allocation budget so that a network bandwidth is not exceeded. For example, if the outgoing total network bandwidth for the server is 20 megabits per second, the video encoder controller 124 keeps track of how much bandwidth each video encoder is producing and controls the encoders so that in combination they do not exceed the network bandwidth. In some implementations the video controller tracks power consumption, latency and encoding speed of the encoders as provided from the encoders (e.g., via the driver).

The processor 112 in this example employs a driver 130 and application interface 132 to interface between the video encoder controller 124 and the cloud-based video encoders 116 and 118. However, any suitable implementation may be employed, and the operations described herein may be combined in any suitable component as desired. For example, the operations of driver 130 may be employed as part of the cloud-based video encoders 116 and 118 and will be described herein as being part of a video encoder.

In this example, the driver 130 generates operational improvement tradeoff data 150 that indicates a tradeoff among different encoder operational settings, in response to current operational coding metrics provided by the cloud-based video encoders 116 and 118 as further described below. Operational improvement tradeoff data 150 in some implementations, indicates a tradeoff in image quality for example, power consumption, bandwidth savings or other operational characteristics for an encoder. The video encoder controller 124, in some implementations, assigns graphics data generated by the GPUs to be encoded in an encoding session and assigns an encode session identifier to each session. Each encoding session is tracked by the video encoder controller 124. The encode session IDs and control information is shown as arrows 134 and 136 respectively. In this example, each cloud-based video encoder 116 and 118 produces a plurality of encoding sessions 138 and 140 respectively wherein each encoding session has encoded data that is encoded by each respective encoder. In some implementations, as further described below, each encoder provides operational encoding metrics 142 and 144 to the driver 130. The operational encoding metrics 142 and 144 are provided for each cloud encoding session and in one example, are provided to the video encoder controller 124 and in other implementations to the driver 130 depending upon which component generates the operational improvement tradeoff data 150 as further described below.

In some implementations, the operational encoding metrics 142 and 144 include for example, one or more of an average encoding time per frame, current power usage associated with the session, current bandwidth being used by the session, current image quality of the session such as through peak signal to noise ratio (PSNR) averaging or video multimethod assessment fusion (VMAF) levels. In some examples, the operational encoding metrics include latency information such as the time taken to output a received frame by the encoder for a particular encoding session. The operational encoding metrics in one example are provided by the video encoder during the video encoding session to provide a type of real time metric mechanism to allow the video encoder controller 124 to allocate encoding resources among various encoding sessions in a more efficient manner.

In some implementations, the cloud-based video encoder 118, for example, generates encoded video data, such as streaming data, for a plurality of encoding sessions 140. The cloud-based video encoder 118 generates operational improvement tradeoff data 150 through driver 130. The operational improvement tradeoff data 150 is based on the operational encoding metrics 142 that are associated with the encoder. The cloud-based video encoder controller 124 changes operational characteristics of one or more encoders for one or more cloud encoding sessions based on the operational encoding tradeoff data 150 from another session. For example, an encoder via driver 130 analyzes its current operating status and checks with its internal power, quality and speed setting options. Given these internal statistics, the encoder, namely the driver 130, provides the operational improvement tradeoff data 150 that indicates a type of return on investment among encoder operational parameters that are changed for an encoding session relative to another ending session. The operational improvement tradeoff data 150 in some examples, is in the form of a table. However, any suitable structure may be employed. For example, where current operational encoding metrics (internal statistics) for an encoder indicate that an encoder can provide additional image quality in return for more bandwidth, this quality return on bandwidth investment information is sent to the video encoder controller 124. The video encoder controller 124 can then determine based on other encoding sessions (and power limitations or network bandwidth limitations) whether to provide more bandwidth capability for the encoder to improve image quality.

Figure 2:
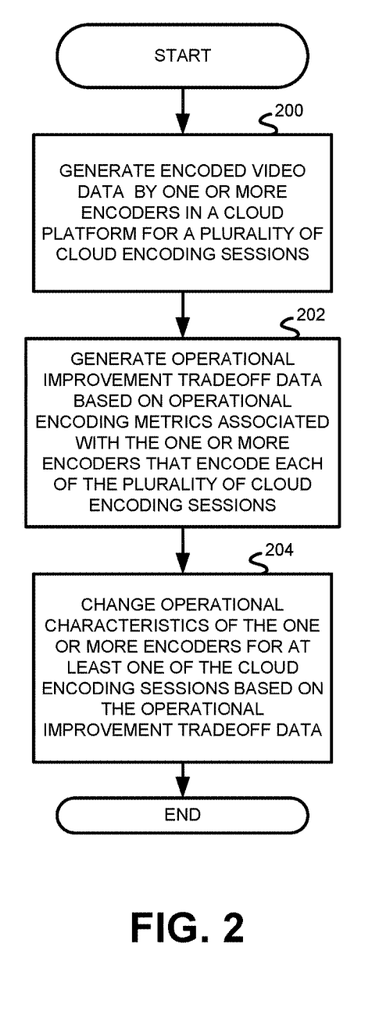
FIG. 2 is a flowchart illustrating a method for providing cloud-based video encoding in accordance with one example set forth in the disclosure.

FIG. 2 is a flowchart illustrating one example of a method for providing cloud-based video encoding that in one example, is carried out by the cloud server 102, however any suitable cloud-based structure may be employed. It will be recognized that the operations may be carried out in any suitable order. In some implementations, as shown in block 200, the method includes generating encoded video data such as streaming data, by a cloud-based video encoder 118 for a plurality of encoding sessions 140. In this example, cloud-based video encoder 118 produces multiple encoded video streams as encoding sessions 140 that are output to respective client devices through a cloud network, such as the internet 110. As shown in block 202, the method includes generating operational improvement tradeoff data 150 based on the operational encoding metrics 142 that from cloud-based video encoder 118 that encodes data for the encoding sessions 140. In this example, the cloud-based video encoder 118 provides the operational encoding metrics to the driver 130 which produces the operational improvement tradeoff data 150. For example, the operational encoding metrics 142 include the current operational encoding metrics that are being produced during encoding of an encoding session. Examples of operational encoding metrics include, but are not limited to, average encoding time per frame, current power usage of the encoder, current bandwidth being used by an encoder for a session, current quality of the session, latency time such as the time to output a received frame for a session such the per session operational encoding metrics are fed back or provided to the driver, in this example, through the driver reading suitable registers that store the information. In some implementations video encoders provide operational encoding metrics to the driver as feedback data through a suitable interface.

In certain implementations, the cloud-based video encoder 118 analyzes its current status and checks its internal power, quality and speed setting options and provides or makes these internal operational encoding metrics available to the driver. The operational encoding metrics 142 may also include the type of content being encoded. For example, the video encoder controller 124 in some implementations informs the encoder (e.g., via the driver) of the type of content that is being encoded so that the encoder can provide the most efficient manner of coding. For example, if the content is live content from a camera that is being encoded, this encoding may be done at a faster rate than encoding of graphics data such as rendered pixels that are displayed on a screen but created by the GPUs as part of the gaming application.

As shown in block 204, the method includes changing the operational characteristics of one or more encoders for one of the cloud encoding sessions based on the operational improvement tradeoff data. For example, the video encoder controller provides control data to the encoders via the driver to change the operational characteristic of an encoder for an encoding session. In one example, the operational improvement tradeoff data is generated by comparing operational encoding metrics from the encoding sessions relative to each other and to available operational setting options for each encoding session. Control data indicates one or more operational characteristics to change for a particular encoding session. To generate the operational improvement tradeoff data, the driver, for example, on a per-encode session basis analyzes the current operational encoding metrics such as the quality of content, frame size, bit count, time to complete a frame and internal power levels compared to an allowable state such as a maximum power level quality level setting or other types of maximum operational settings for an encoder to determine how much available room there is between a current setting and a maximum setting for the encoder for a given encoding metric. The operational encoding metrics are provided in response to encoding that is occurring for each of the cloud encoding sessions, in some implementations, to provide real time encoding information back to the video controller to change settings to improve overall encoding tasks in the platform.

Examples of operational improvement tradeoff data, which in some implementations is provided in a table, includes data that represents: an image quality increase will occur for the cloud encoding session based on an increase in bandwidth allocation for the encoder, an image quality increase will occur for the cloud encoding session based on an increase in power for the encoder, an image quality increase will occur for the cloud encoding session based on an increase in encode time allowed for the encoder, an encoding speed increase will occur for the cloud encoding session based on an increase in power for the encoder, a power savings will occur for the encoder based on an increase in encode time allowed for the encoder, a bandwidth saving will occur for the cloud encoding session based on more power for the encoder, and a bandwidth saving will occur for the cloud encoding session based on more encoding time allowed for the encoder.

Figure 3:
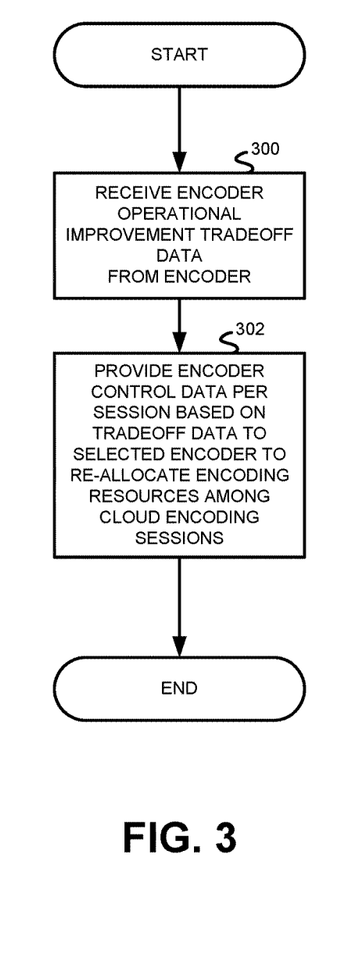
FIG. 3 is a flowchart illustrating a method for providing cloud-based video encoding in accordance with one example set forth in the disclosure.

Referring also to FIG. 3, a method for providing cloud-based video encoding is illustrated from the perspective of the video encoder controller. As shown in block 300, the method includes receiving encoder operational improvement tradeoff data 150 from the encoder (e.g., from the driver 130) and as shown in block 302, the method includes providing encoder control data per session as needed, based on tradeoff data to selected encoders to reallocate encoding resources among cloud encoding sessions. In some implementations, instead of the video encoder controller receiving the encoder operational improvement tradeoff data, the controller generates the tradeoff data based on received current operational encoding metrics from the encoders. Providing control data, in some implementations, causes, one or more of the encoders to perform various operational changes such as one or more of increasing image quality for video of one of the cloud encoding sessions, increasing encoding speed for one of the cloud encoding sessions, improving power savings associated with producing encoding data for one of the cloud encoding sessions and/or increasing bandwidth savings for one of the cloud encoding sessions.

The operational improvement tradeoff data can be based on an image quality information (e.g., VMAF level information) and/or encoder performance information. For example operational improvement tradeoff data in some implementation is based on image quality information being generated by each encoder or for each encoding session where a single encoder (or multiple encoders) is generating multiple encoder sessions or where multiple encoders are used. In other implementations, operational tradeoff data is based on encoder performance information such as average encoding time per frame, current power usage, current bandwidth being used by encoder for the session and frame out latency (time to output a received frame).

A number of use case examples will now be described. In one example, where there are two sessions, S1, and S2, prior systems would have the encoder choose to split the bitrate spending between the two sessions equally (assuming comparable available bandwidths and similar resolution). In contrast to prior systems, the cloud-based video encoder 118 informs the server video encoder controller that based on the recent nature of content for both sessions, investing bits on S1 leads to much more return on investment on perceptual quality (e.g., measured in VMAF), than investing bits on S2. Accordingly, the video encoder controller chooses to allocate more bitrate for S1 than for S2 and sends control data to carry out the change in session operation, leading for an improvement in the users' experience, while still adhering to bitrate/cost constraints from the overall server perspective.

In another example wherein two sessions, S1 and S2, run on two separate encoders both of which are controlled by the video encoder controller of the server, when the controller is deciding to spend more power investment on S1 or S2, S1 is running on fast moving content, and extra power can help S1 enlarge its search range to improve quality more significantly, while S2 is saturated at its quality and does not benefit from this power addition. In this case the quality return on the power investment of S1 is higher than S2, so the video encoder controller makes the decision to spend that extra power on S1.

In yet another example, because improving image quality requires more cycles of calculation, based on the tradeoff data provided by the encoder, the video encoder controller (e.g., the server executing an application) chooses one of the following options based on a resource budget: keep a same encoding time, but boost up encoder processing frequency (more power investment); or keep the same encoder processing frequency, but take a longer time (more encode time investment) to produce the encoded data. If, for example, a service provider has a power budget, is some implementations each video encoder provides, through the driver, a prediction of power consumption based on the operational frequency and voltage used by the encoder. If one video encoder is allocated with limited power budget, it will get lower operational frequency and voltage setting from the encoder controller such that the particular encoder has a lower encoding speed, a higher latency or a lower quality.

In some implementations, the operational improvement tradeoff data is based on a difference in content type being encoded in each of the plurality of cloud encoding sessions. In some implementations, the operational improvement tradeoff data is based on image quality information being generated by each of the encoders for each cloud encoding session when, for example, the video data is fast moving content such as from a camera.

For example, where the content type is of a real time video content such as that generated by a camera from a client device, and another encoding session is for encoding graphics content created by the graphics processor, the tradeoff data indicates that a tradeoff exists that allows a higher quality video to be output in one session with the camera data compared to the other session so that the other session can have a smaller bit rate. The session with the graphics content is limited in the amount of bandwidth compared to the session with live video so that the session with live video has an encoder that is controlled by control data to increase power, for example, by increasing the frequency of operation. As such, an image quality increase will occur for the cloud encoding session of the live video based on an increase in power for the encoder. This tradeoff data is provided to the controller which then appropriately controls the encoder to carry out the increase in image quality if, for example, the increase does not, cause excess network bandwidth to occur that is beyond a maximum amount. As such in some implementations the video encoder controller compares the tradeoff data to budget limit data set by the service provider to see if a conflict would exist from a change in encoder operation. If a conflict is detected, the encoder controller will limit under certain circumstances whether the tradeoff actually occurs.

Figure 4:
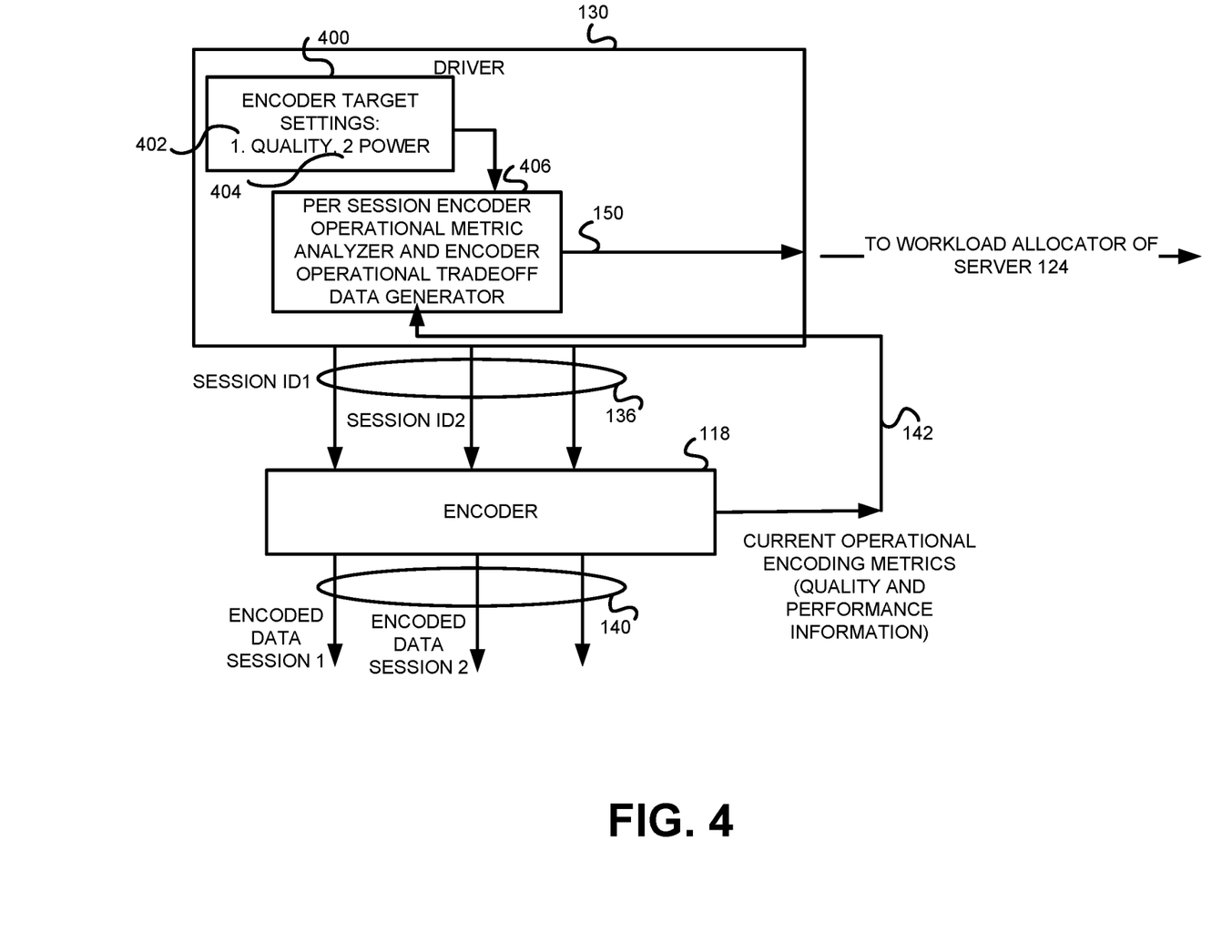
FIG. 4 is a block diagram illustrating an encoder in accordance with one example set forth in the disclosure.

Referring also to FIGS. 4-7, an example of the operation of the encoder shown in FIG. 4 will be described. FIG. 4 illustrates an example of the driver 130 operation to generate per session server operational improvement tradeoff data 150 based on operational encoding metrics 142. As shown, the cloud-based video encoder 118 provides the current operational encoding metrics such as quality and performance statistics for each encoding session. This information may be provided in any suitable manner including through register access or a periodic push operation to the driver. In certain implementations, the driver stores encoder maximum budget settings 400 for each encoder and/or encoding session such as a target quality 402 and a power setting 404 that the encoder can operate at.

The driver 130 serves as a per session encoder operation analyzer and encoder operational tradeoff data generator 406 which in this example compares the operational encoding metrics provided by the operational encoding metrics 142 with the target quality and power settings 402 and 404 to see if there is any available capability for the encoder to change. In some implementations, if the quality of a current encoding session has not reached the target quality but allowable power consumption of video encoder has available capability, the driver adjusts the encoding preset of the video encoder from a speed preset to a quality preset and set a higher operating frequency and voltage to get high quality without sacrificing encoding speed. In some examples, the operational encoding metrics if they include encoder power usage that is currently being at a level that is currently being used, is compared to a power setting 404 for the encoder. The difference is then used to indicate whether additional power can be applied to the cloud-based video encoder 118. Where the operational encoding metric includes a quality of content measurement, the quality of content measurement is compared to the target quality 402 to see if there can be additional quality of content improvements made by the encoder. Similar comparisons to encoder maximum settings, for example, for frame size, bit count time to complete a frame and other encoding metrics are also employed as desired. The per session encoder operation metric analyzer and encoder operational tradeoff data generator 406 in some implementations calculates an efficiency metric such as calculating VMAF levels to determine if a current VMAF level being provided on a per session basis is too low or too high given a desired threshold. The threshold may be pre-defined value in the driver or may be decided by the encoder controller. Any suitable efficiency metric or other metrics may be employed such as one or more of throughput levels, latency levels or video quality levels.

Figure 5:
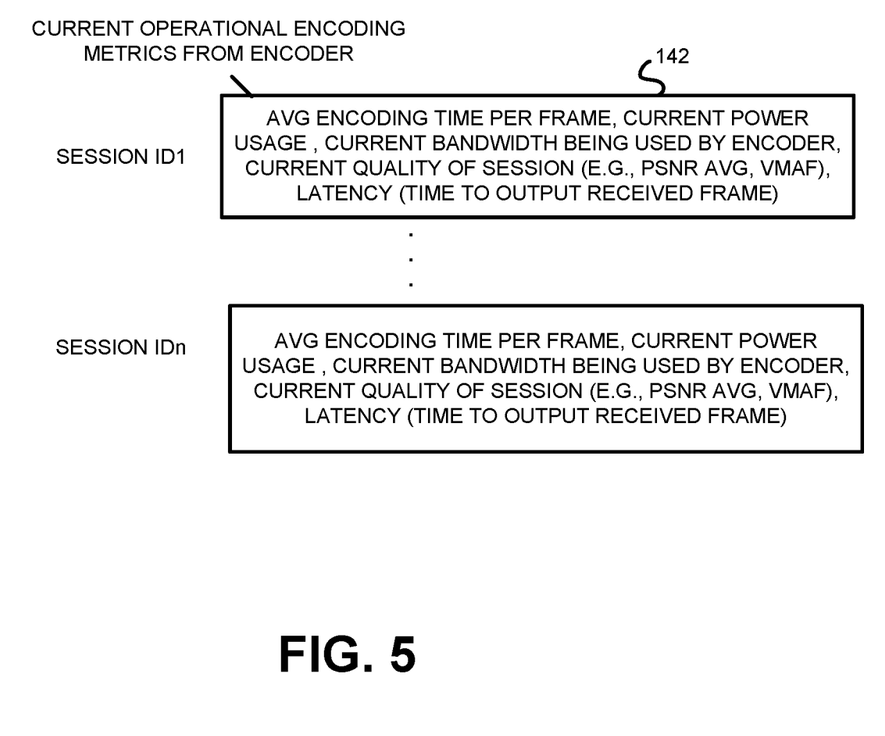
FIG. 5 is a diagram illustrating operational encoding metrics associated with an encoder in accordance with one example set forth in the disclosure.

For example, as shown in FIG. 5, current operational encoding metrics from the cloud-based video encoder 118 are provided on a per session ID level basis. In some examples, the current operational encoding metrics include an averaging encoding time per frame, a current power usage level or the encoder current bandwidth being used by the encoder for a given session, current quality of the session such as the PSNR average or VMAF, and latency time to output a received frame. These metrics are compared to corresponding allowable maximum/minimum metrics by the driver 130 and where there is a difference, the driver determines that an increase in or operational improvement for an encoding session can be accomplished through changing operational characteristics of the encoder through control data.

Figure 6:
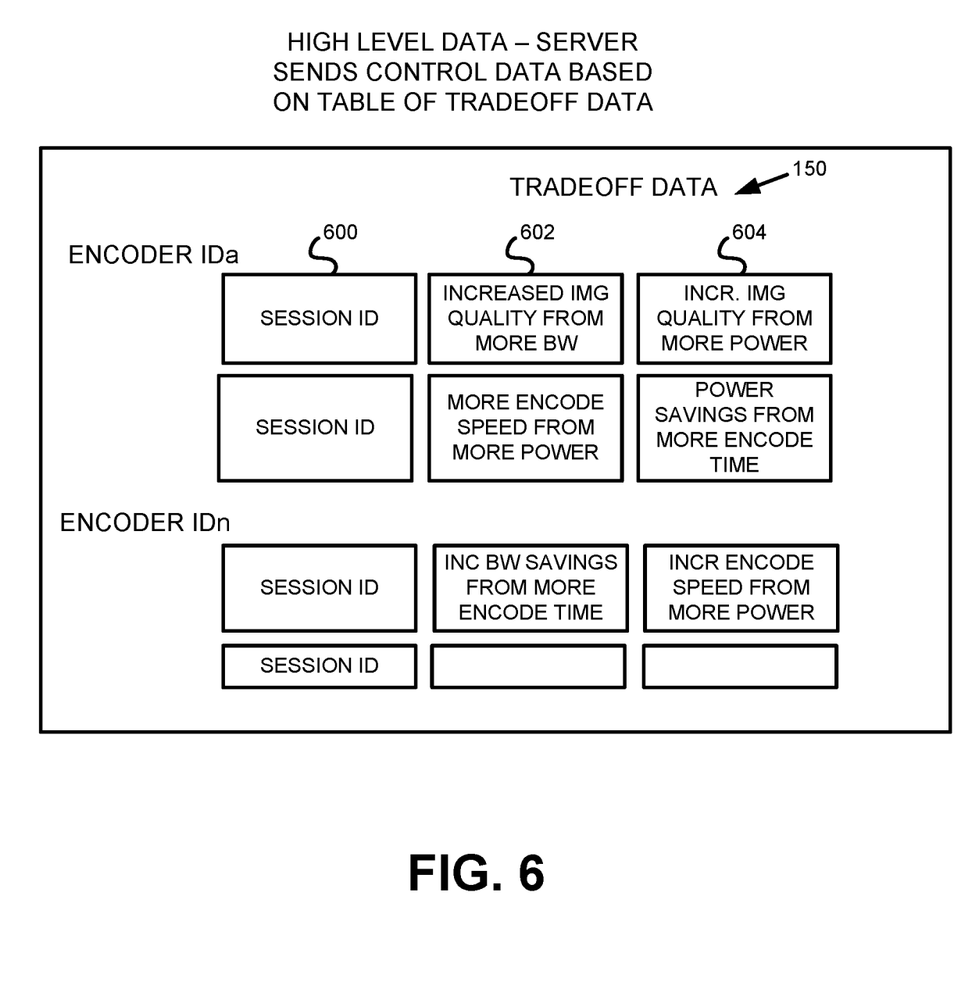
FIG. 6 is a diagram illustrating operational improvement tradeoff data in accordance with one example set forth in the disclosure.

As shown in FIG. 6, the operational improvement tradeoff data 150 generated by the driver 130 (or by the encoder controller or other entity if desired) indicates on a per session basis and encoder basis, potential tradeoffs between an encoder's various operational metrics. For example, session 600 is shown to have an ability to be improved where the tradeoff is between increasing image quality by increasing bandwidth for the encoder as shown in block 602 and increasing image quality by applying more power to the encoder as shown in block 604. This occurs, for example, where the driver determines that the current operational encoding metrics for the session allow room for improved quality because the quality level is not as high as the allowable maximum level and that the increase in quality occurs from allowing more bandwidth consumption of the encoder session. Similarly, for the same session, other changes can be made such as increasing the image quality through another mechanism such as through applying more power which, for example, includes increasing the frequency of operation of the encoder for the given session. In some implementations, the tradeoffs are determined relative to other sessions.

Figure 7:
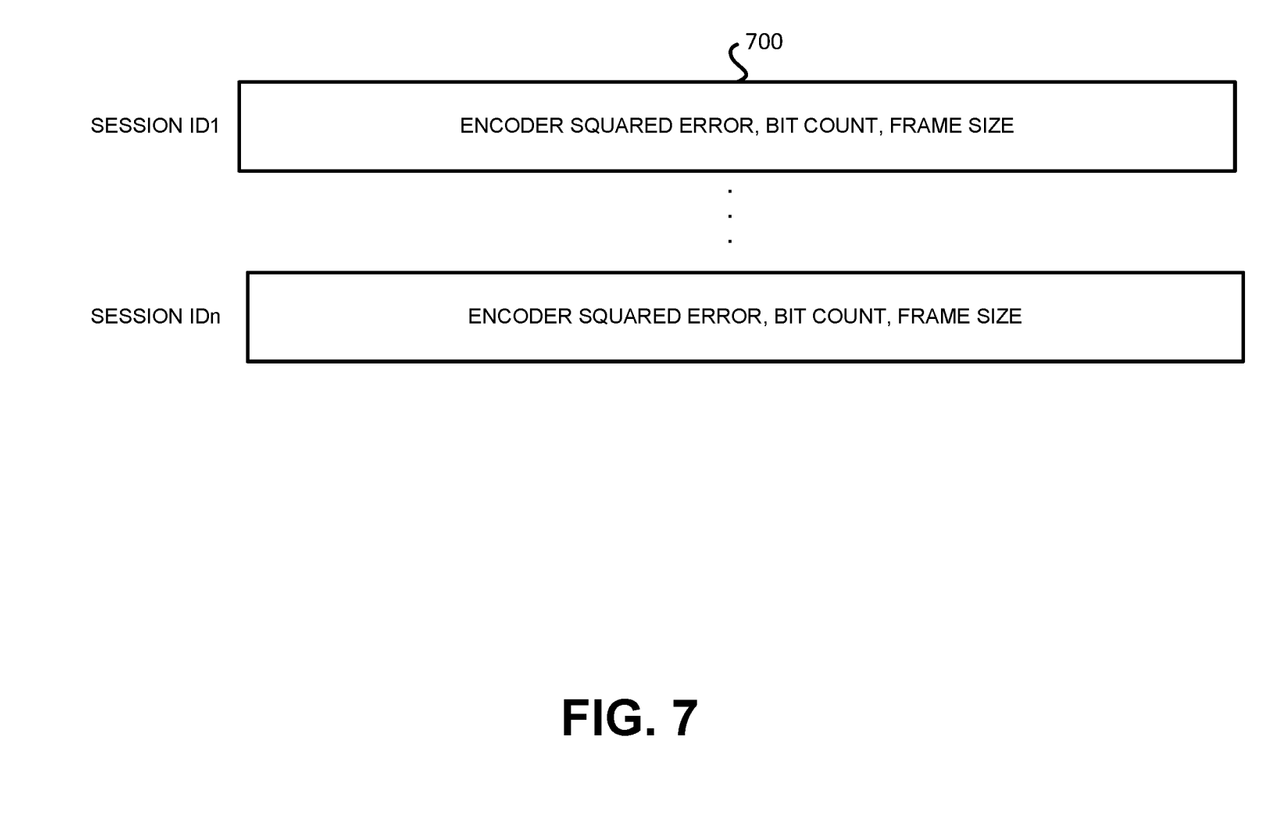
FIG. 7 is a diagram illustrating of operational improvement tradeoff data in accordance with one example set forth in the disclosure.

FIG. 7 illustrates another form of operational encoding metrics that can be sent from the encoder or generated by the driver such as the average encoding squared error value 700 between reconstructed video and source video that is a quality metric. When the square error value is higher, the resulted video quality is lower.

As described above, in some implementations, the cloud server allocates encoding resources among the cloud encoding sessions to provide one of more of increasing image quality, increasing power savings, increasing encoding speed, increasing bandwidth savings, decreasing frame throughput latency or other performance operation for one or more of the cloud encoding sessions. As described herein, in some implementations, a cloud server provides cloud-based video encoding and includes a processor that executes an application that causes generation of cloud-based graphics content as video data for a remote device. The cloud server includes a plurality of graphics processors (e.g., cores) each operative to generate the cloud-based graphics content for a plurality of cloud encoding sessions, a cloud-based video encoder controller and one or more video encoders operative to encode video data that is produced by the graphics processors or other frame generator, and produce a plurality of cloud encoding sessions. In some implementations, the encoders (e.g., such as a driver that interfaces with the encoders) generate operational improvement tradeoff data in response to operational encoding metrics associated with the one or more encoders. In certain implementations the cloud-based video encoder controller changes operational characteristics of the one or more encoders for at least one of the cloud encoding sessions based on the operational encoding tradeoff data.

Figure 8:
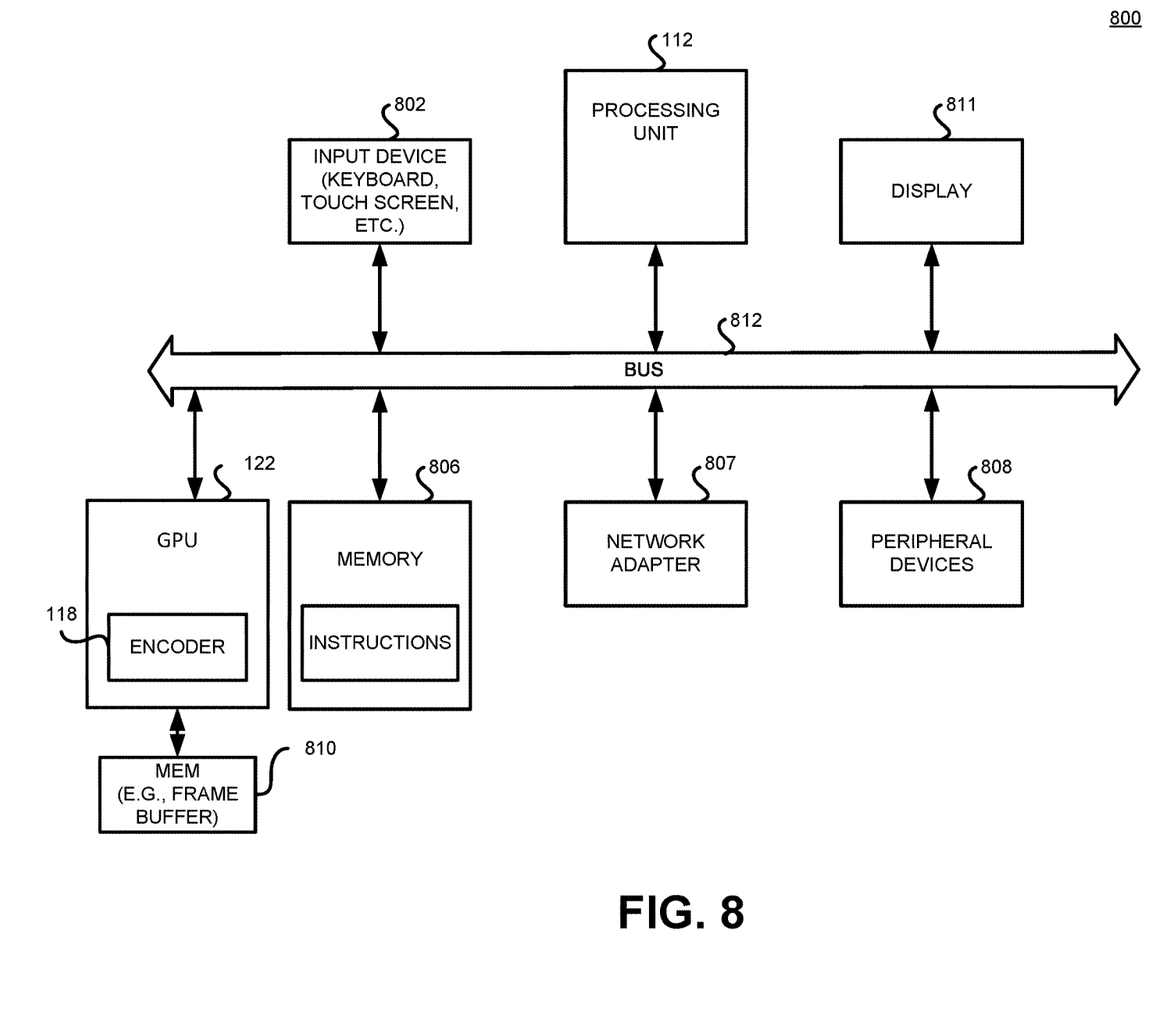
FIG. 8 is a block diagram illustrating an apparatus for providing cloud-based video encoding in accordance with one example set forth in the disclosure.

FIG. 8 illustrates an embodiment of a computing system 800 that is employed in the cloud server 102 that uses the graphics driver 130 and graphics processor 122 as described herein. In general, the computing system 800 is embodied as any of a number of different types of devices, including but not limited one or more cloud servers, or other device and the CPU, GPU and memory may be system on-chip, integrated circuits, multipackage device etc. In this example, the computing system 800 includes a number of components that communicate with each other through a bus 812. In computing system 800, each of the components is capable of communicating with any of the other components either directly through the bus 812, or via one or more of the other components. The components in computing system 800 in some implementations are contained within a single physical enclosure, such as a laptop or desktop chassis, or a mobile phone casing or in some implementations the display is remote from a system on-chip or other configuration. In alternative embodiments, some of the components of computing system 800 are embodied as peripheral devices such that the entire computing system 800 does not reside within a single physical enclosure.

In some implementations, the computing system 800 also includes user interface devices for receiving information from or providing information to a user. Specifically, the computing system 800 includes a client device 108, such as a keyboard, mouse, touch-screen, or other device for receiving information from the user. The computing system 800 displays information to the user via a single physical monitor 811, such as light-emitting diode (LED) display, liquid crystal display, or other output device. However, such devices need not be employed. The GPU uses frame buffer memory 810 to store frames of created graphics images for encoding by the encoder.

In certain implementations, computing system 800 additionally includes a network adapter 807 for transmitting and receiving data over a wired or wireless network. Computing system 800 also includes one or more peripheral devices 808. The peripheral devices 808 may include mass storage devices, location detection devices, sensors, input devices, or other types of devices used by the computing system 800.

Computing system 800 includes a processing unit such as processor 112. The processing unit receives and executes instructions that are stored in a memory system 806. In one embodiment, the processor 112 includes multiple processing cores that reside on a common integrated circuit substrate. Memory system 806 includes memory devices used by the computing system 800, such as random-access memory (RAM) modules, read-only memory (ROM) modules, hard disks, and other non-transitory computer-readable media. Some of the memory devices are used as memory 806 for the processor 112.

Some embodiments of computing system 800 may include fewer or more components than the embodiment as illustrated in FIG. 8. For example, certain embodiments are implemented without any display 811 or input devices 802. Other embodiments have more than one of a particular component, for example, an embodiment of computing system 800 could have multiple processors 112, buses 812, network adapters 807, memory systems 806, etc.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing cloud-based video encoding comprising:
    generating encoded video data by one or more encoders in a cloud platform for a plurality of cloud encoding sessions;
    generating operational improvement tradeoff data corresponding to one or more encoders in the cloud platform in response to on operational encoding metrics associated with the one or more encoders; and
    changing operational characteristics of one or more of the encoders to reallocate encoding resources among cloud encoding sessions, for at least one of the cloud encoding sessions based on the operational improvement tradeoff data.

2. The method of claim 1 comprising:
    providing the operational encoding metrics in response to encoding for each of the plurality of cloud encoding sessions; and
    wherein changing operational characteristics comprises providing control data for the one or more encoders based on the operational improvement tradeoff data.

3. The method of claim 1 wherein generating operational improvement tradeoff data comprises:
    comparing operational encoding metrics from the plurality of encoding sessions relative to each other and to available operational setting options for each encoding session and wherein the control data indicates one more operational characteristics to change for one of the encoding sessions.

4. The method of claim 2 wherein providing control data causes at least one of:
    an increase in image quality for video of one of the cloud encoding sessions;
    an increase in encoding speed for one of the cloud encoding sessions;
    an improvement in power savings associated with producing encoded data for one of the cloud encoding sessions; and
    an increase in bandwidth savings for one of the cloud encoding sessions.

5. The method of claim 1 wherein generating operational improvement tradeoff data comprises generating data for a cloud encoding session that represents at least one of:

an image quality increase will occur for the cloud encoding session based on an increase in bandwidth allocation for the encoder;

an image quality increase will occur for the cloud encoding session based on an increase in power for the encoder;

an image quality increase will occur for the cloud encoding session based on an increase in encode time allowed for the encoder;

an encode speed will occur for the cloud encoding session based on an increase in power for the encoder;

a power savings will occur for the encoder based on an increase in encode time allowed for the encoder;

a bandwidth saving will occur for the cloud encoding session based on more power for the encoder; and a bandwidth saving will occur for the cloud encoding session based on more encoding time allowed for the encoder.

6. The method of claim 1 wherein the plurality of encoding sessions are encoded on a same encoder and wherein generating operational improvement tradeoff data is based on a difference in content type being encoded in the plurality of cloud encoding sessions.

7. The method of claim 1 wherein the plurality of cloud encoding sessions are encoded on different encoders and wherein generating operational improvement tradeoff data is based on a quality level being generated by each encoder for each cloud encoding session.

8. The method of claim 2 wherein changing operational characteristics comprises providing control data to the one or more encoders that changes an image quality level one of the cloud encoding sessions based on the operational improvement tradeoff data.

9. An apparatus for providing cloud-based video encoding comprising:
- a cloud-based video encoder controller;
- one or more video encoders operative to:
  - generate encoded video data by one or more encoders in a cloud platform for a plurality of cloud encoding sessions;
  - generate operational improvement tradeoff data in response to operational encoding metrics associated with the one or more encoders; and
  - wherein the cloud-based video encoder controller is operative to change operational characteristics of the one or more encoders to reallocate encoding resources among cloud encoding sessions, for at least one of the cloud encoding sessions based on the operational encoding tradeoff data.

10. The apparatus of claim 9 wherein the one or more encoders are configured to provide operational encoding metrics for each of the plurality of cloud encoding sessions to the encoder controller; and
wherein the encoder controller is operative to generate the operational improvement tradeoff data based on the operational encoding metrics for each of the plurality of encoding sessions; and wherein the video encoder controller is operative to change operational characteristics of the one or more encoders by providing control data to the one or more encoders based on the operational improvement tradeoff data.

11. The apparatus of claim 9 wherein the encoder controller is operative to generate operational improvement tradeoff data by:
comparing operational encoding metrics from the plurality of encoding sessions relative to each other and to available operational setting options for the encoder and wherein the control data indicates one more operational characteristics to change for one of the encoding sessions.

12. The apparatus of claim 10 wherein one or more of the encoders is configured to provide control data that causes at least one of:
- an increase in image quality for video of one of the cloud encoding sessions;
- an increase in encoding speed for one of the cloud encoding sessions;
- an improvement in power savings associated with producing encoded data for one of the cloud encoding sessions; and
- an increase in bandwidth savings for one of the cloud encoding sessions.

13. The apparatus of claim 9 wherein one or more of the encoders is operative to generate operational improvement tradeoff data by generating data for a cloud encoding session that represents at least one of:
- an image quality increase will occur for the cloud encoding session based on an increase in bandwidth allocation for the encoder;
- an image quality increase will occur for the cloud encoding session based on an increase in power for the encoder;
- an image quality increase will occur for the cloud encoding session based on an increase in encode time allowed for the encoder;
- an encode speed will occur for the cloud encoding session based on an increase in power for the encoder;
- a power savings will occur for the encoder based on an increase in encode time allowed for the encoder;
- a bandwidth saving will occur for the cloud encoding session based on more power for the encoder; and
- a bandwidth saving will occur for the cloud encoding session based on more encoding time allowed for the encoder.

14. The apparatus of claim 9 wherein the plurality of encoding sessions are encoded on a same encoder and wherein generating operational improvement tradeoff data is based on a difference in content type being encoded in the plurality of cloud encoding sessions.

15. The apparatus of claim 9 wherein the plurality of cloud encoding sessions are encoded on different encoders and wherein generating operational improvement tradeoff data is based on a quality level being generated by each encoder for each cloud encoding session.

16. The apparatus of claim 9 wherein changing operational characteristics comprises providing control data to the one or more encoders that changes an image quality level of one of the cloud encoding sessions based on the operational improvement tradeoff data.

17. A cloud server for providing cloud-based video encoding comprising:
- a processor configured to execute an application that causes generation of cloud-based graphics content as video data for a remote device;
- a plurality of graphics processors each operative to generate the cloud-based graphics content for a plurality of cloud encoding sessions;
- a cloud-based video encoder controller;
- one or more video encoders operative to:
  - generate encoded video data by one or more encoders in a cloud platform for a plurality of cloud encoding sessions;

generate operational improvement tradeoff data in response to operational encoding metrics associated with the one or more encoders; and wherein the cloud-based video encoder controller is operative to change operational characteristics of the one or more encoders to reallocate encoding resources among cloud encoding sessions, for at least one of the cloud encoding sessions based on the operational encoding tradeoff data.

18. The server of claim 17 wherein the one or more encoders are configured to provide operational encoding metrics for each of the plurality of cloud encoding sessions to the encoder controller; and wherein one or more of the encoders generates the operational improvement tradeoff data based on the operational encoding metrics for each of the plurality of encoding sessions; and wherein the encoder controller changes operational characteristics of one or more encoders by providing control data to the one or more encoders based on the operational improvement tradeoff data.

19. The apparatus of claim 17 wherein one of more of the encoders is operative to generate operational improvement tradeoff data by:

comparing operational encoding metrics from the plurality of encoding sessions relative to each other and to available operational setting options for the encoder and wherein the control data indicates one more operational characteristics to change for one of the encoding sessions.

20. The server of claim 17 wherein one or more of the encoders is operative to generate operational improvement tradeoff data by generating data for a cloud encoding session that represents at least one of:

an image quality increase will occur for the cloud encoding session based on an increase in bandwidth allocation for the encoder;

an image quality increase will occur for the cloud encoding session based on an increase in power for the encoder;

an image quality increase will occur for the cloud encoding session based on an increase in encode time allowed for the encoder;

an encode speed will occur for the cloud encoding session based on an increase in power for the encoder;

a power savings will occur for the encoder based on an increase in encode time allowed for the encoder;

a bandwidth saving will occur for the cloud encoding session based on more power for the encoder; and a bandwidth saving will occur for the cloud encoding session based on more encoding time allowed for the encoder.

* * * * *